Figure 1:
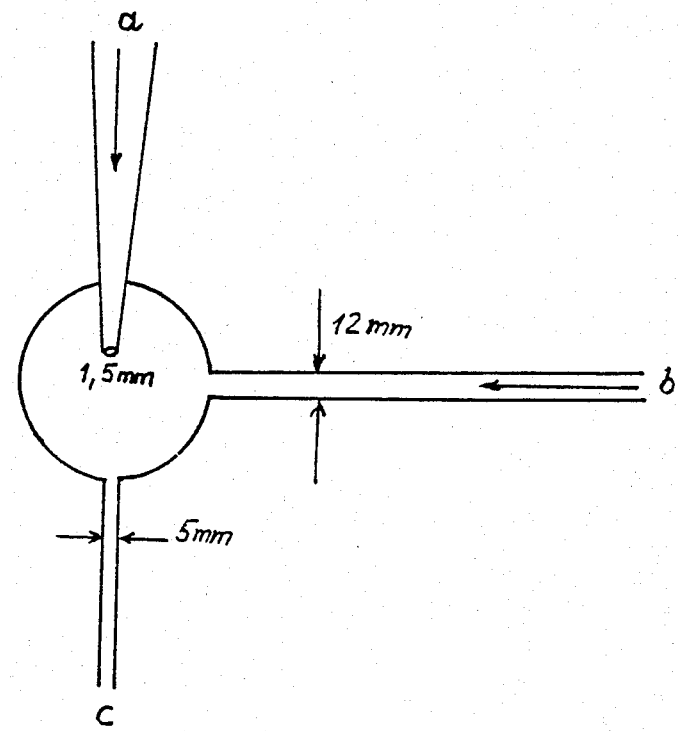

United States Patent [19]

Erkens et al.

[11] Patent Number: 4,872,915
[45] Date of Patent: Oct. 10, 1989

[54] ORTHORHOMBIC LEAD CHROMATE PIGMENTS OF GREENISH HUE

[75] Inventors: Leonardus J. H. Erkens; Gerben P. Algra; Jacobus M. H. Snijders, all of Maastricht; Herman J. J. M. Geurts, Kerkrade, all of Netherlands; André Pugin, Pont-la-Ville, Switzerland

[73] Assignee: Ciba-Geigy Corporation, Ardsley, N.Y.

[21] Appl. No.: 22,617

[22] Filed: Mar. 3, 1987

Related U.S. Application Data

[63] Continuation of Ser. No. 755,886, Jul. 17, 1985, abandoned.

[30] Foreign Application Priority Data

Jul. 25, 1984 [CH] Switzerland .................... 3600/84
Jan. 30, 1985 [CH] Switzerland .................... 398/85

[51] Int. Cl.$^4$ ............................................ C09C 1/20
[52] U.S. Cl. .................................. 106/433; 106/432; 106/453; 106/493
[58] Field of Search ............... 106/288 Q, 297, 298, 106/308 B, 309

[56] References Cited

U.S. PATENT DOCUMENTS

| | | | |
|---|---|---|---|
| 3,370,971 | 2/1968 | Linton | 106/298 |
| 3,639,133 | 2/1972 | Linton | 106/298 |
| 3,923,538 | 12/1975 | Jackson | 106/298 |
| 4,046,588 | 9/1977 | Einerhand et al. | 106/298 |
| 4,505,954 | 3/1985 | Hokamura et al. | 427/380 |

OTHER PUBLICATIONS

DIN 53235.
DIN 5033.
H. Kittel, "Pigmente", 1960, 278–279.

*Primary Examiner*—Paul Lieberman
*Assistant Examiner*—Willie J. Thompson
*Attorney, Agent, or Firm*—Harry Falber

[57] ABSTRACT

The invention relates to orthorhombic lead chromate pigments of greenish hue, which contain lead chromate and lead sulfate in the weight ratio of 60:40 to 100:0, and which are characterized by a tinctorial strength of 0.067 to 0.103 at a standard depth of shade of 1/25 in accordance with DIN 53 235 and by an opacity factor $Y_{black}/Y_{white}$ of 0.78 to 0.87. These pigments are obtainable by mixing an aqueous solution of a chromate and, if necessary, of a sulfate, under high turbulence.

14 Claims, 8 Drawing Sheets

Figure 2, Example 1

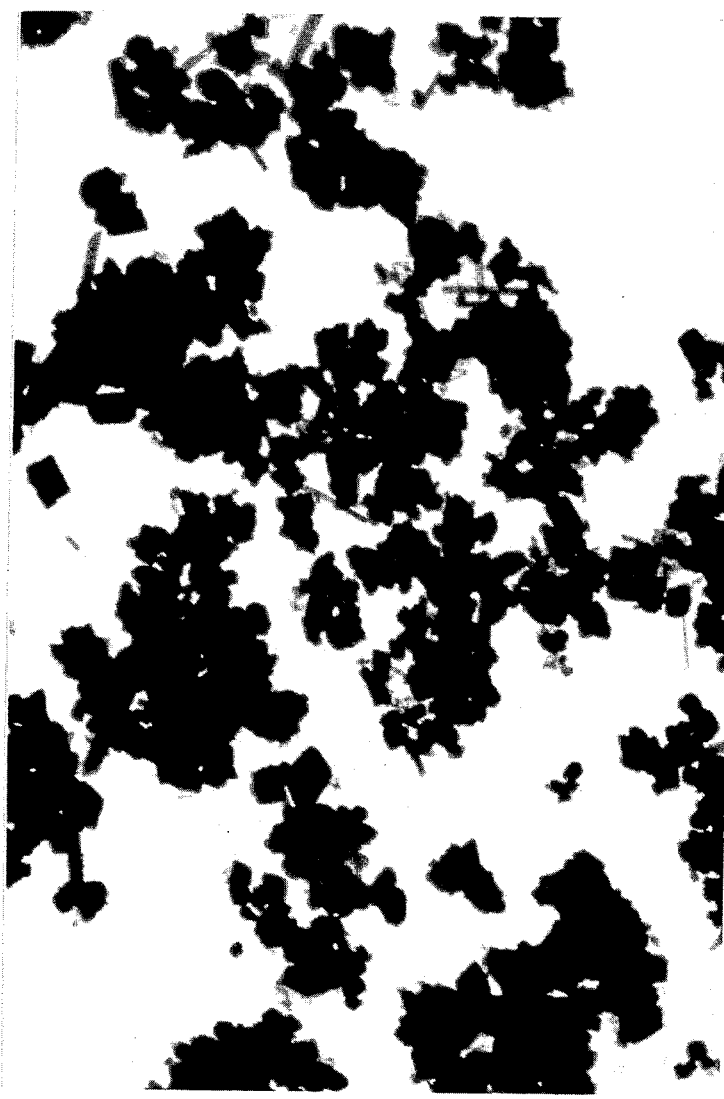
Figure 3, Example 2

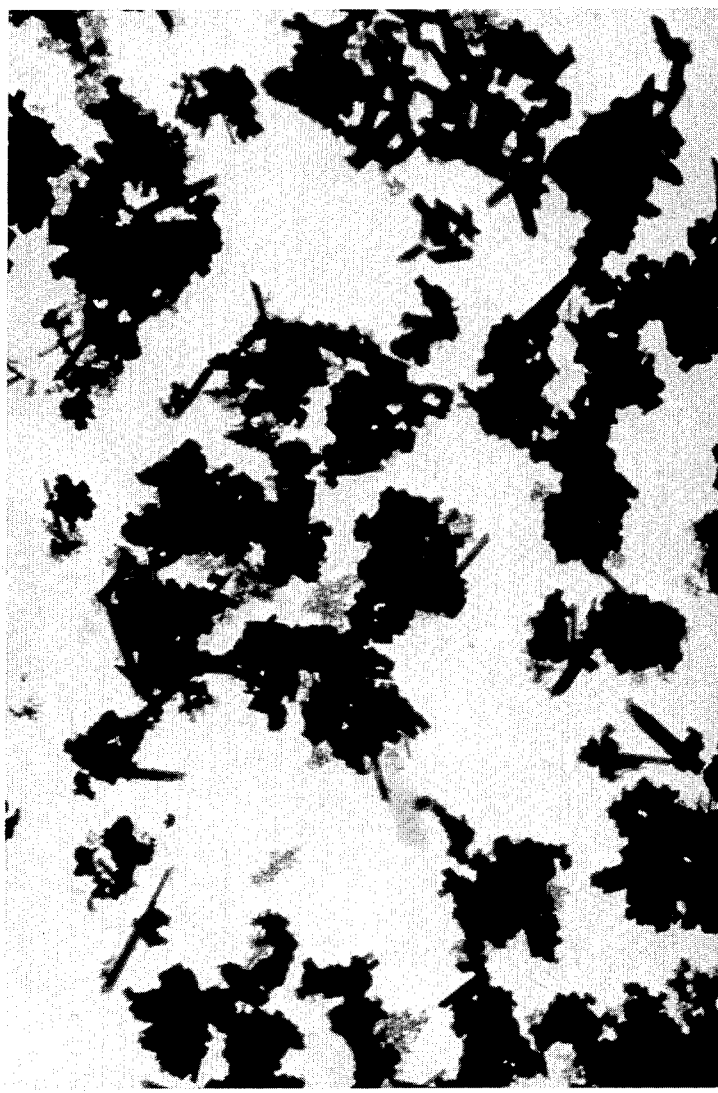
Figure 4, Example 3

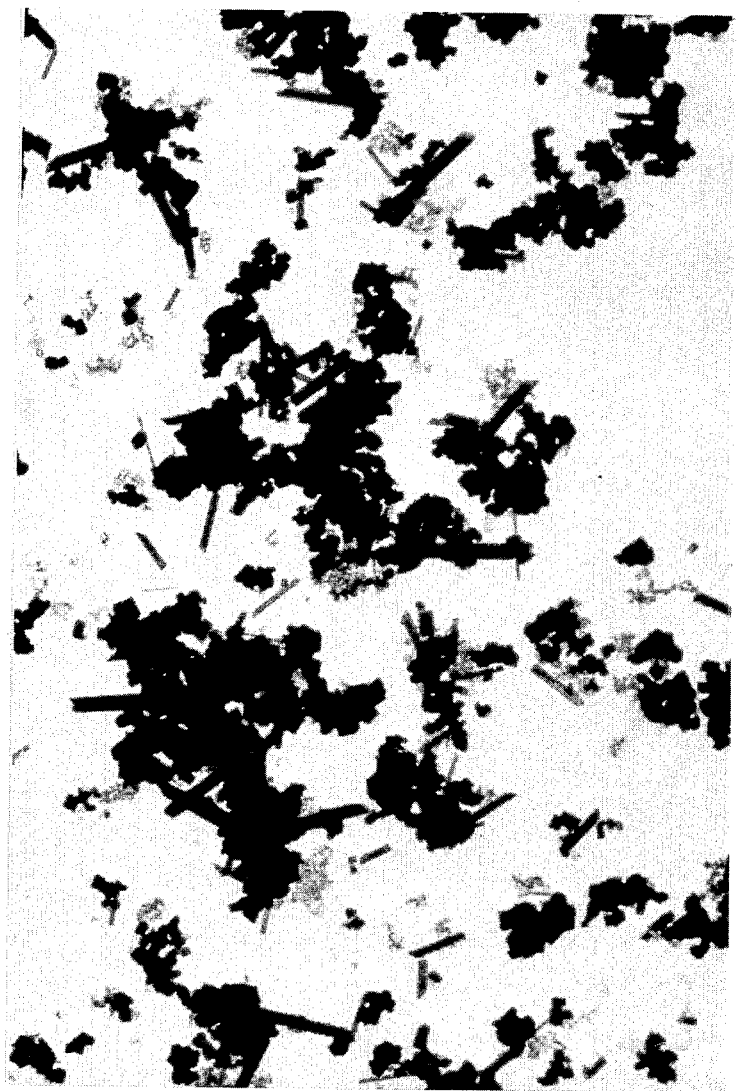
Figure 5, Example 4

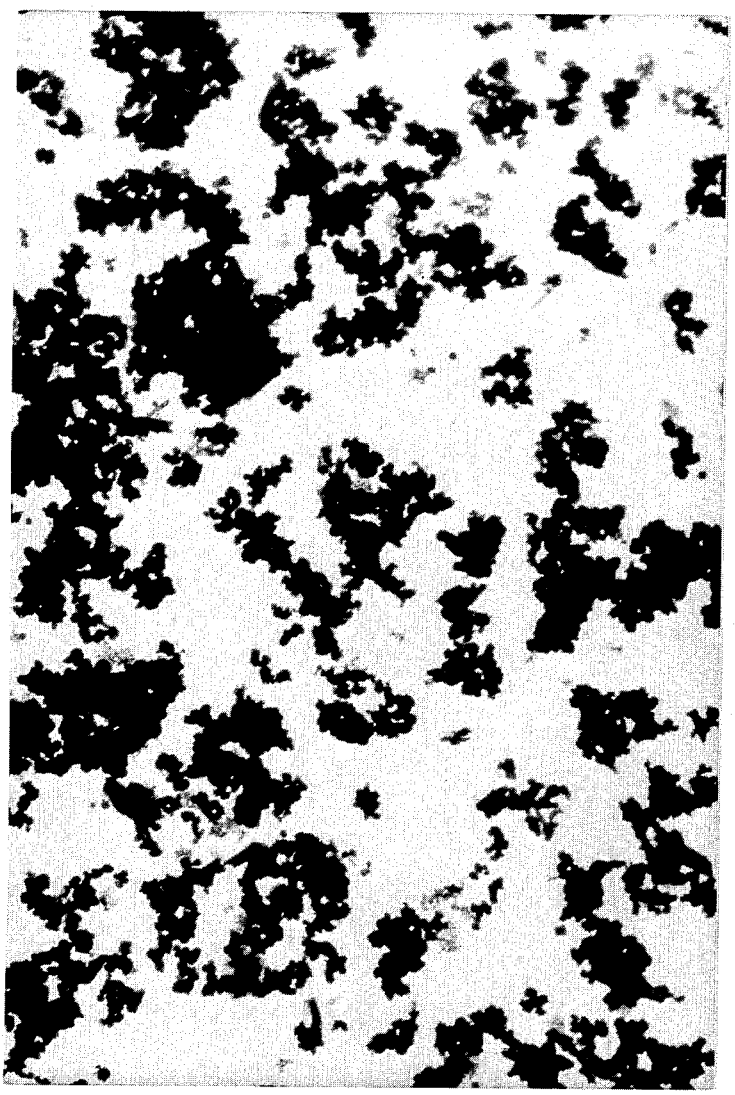
Figure 6, Example 5

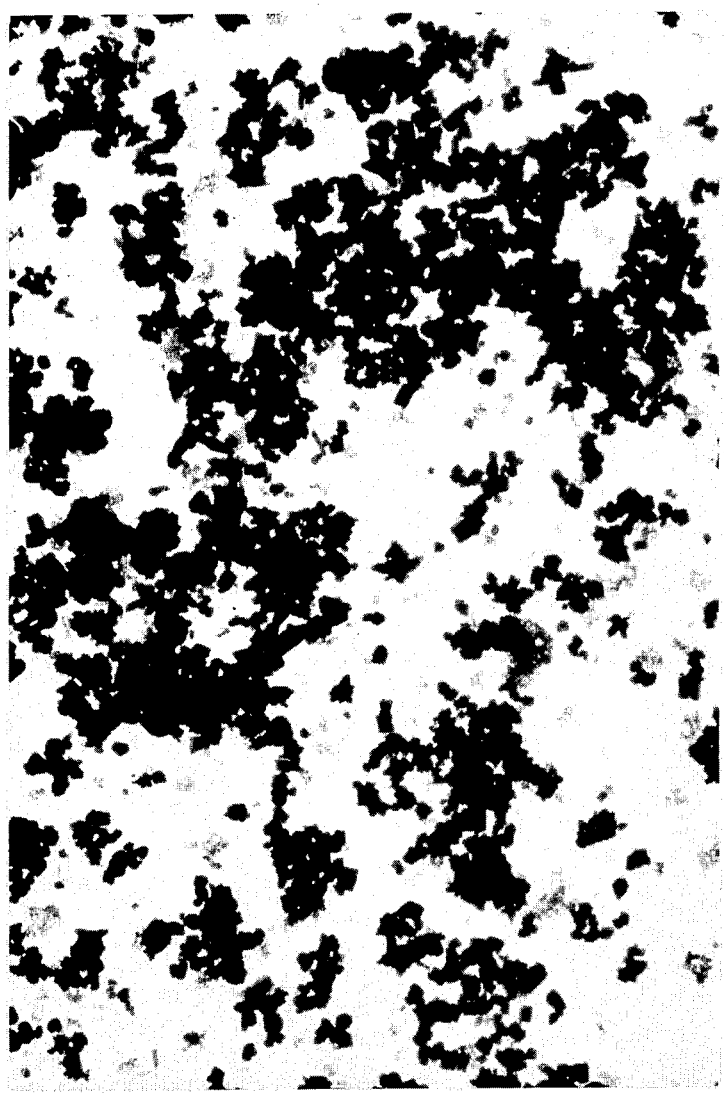
Figure 7, Example 6

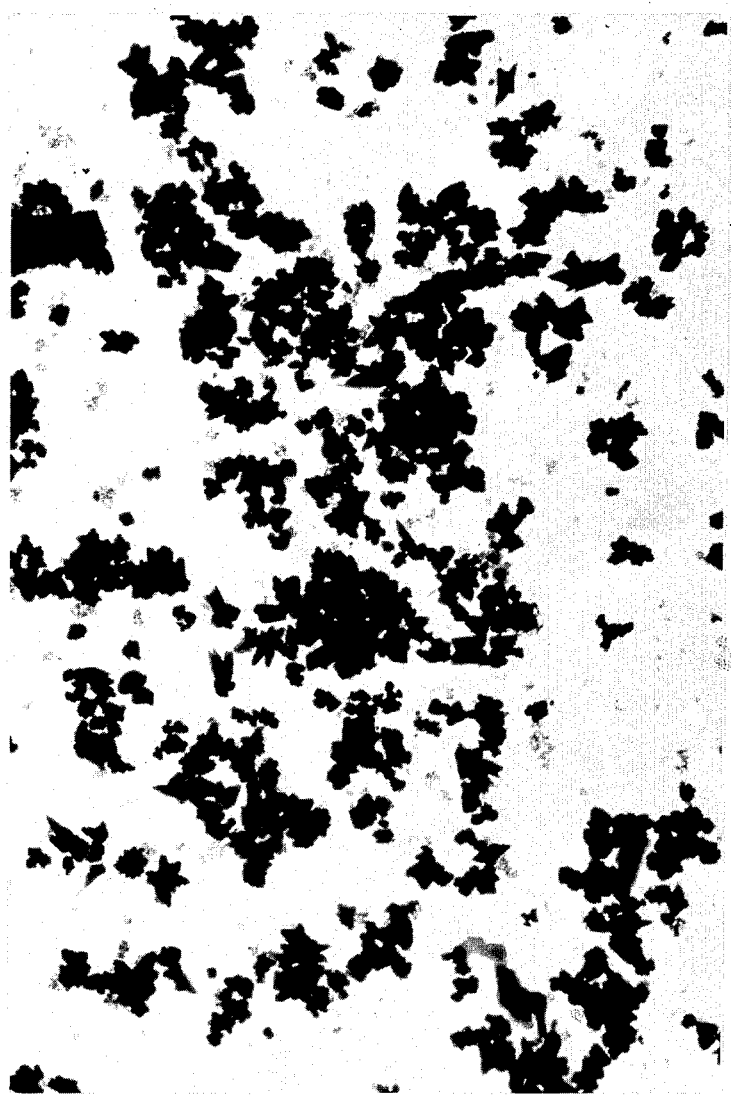
Figure 8, Example 7

ORTHORHOMBIC LEAD CHROMATE PIGMENTS OF GREENISH HUE

This application is a continuation of application Ser. No. 755,886, filed 7/17/85, now abandoned 5/18/87.

The present invention relates to orthorhombic lead chromate pigments of greenish hue which are distinguished, in application, by particularly good colour strength and good hiding power.

Lead chromate pigments have been used for many years, in particular for colouring plastics materials and paints. Preferred pigments are those consisting of small particles that differ insignificantly in size.

Lead chromate pigments in orthorhombic crystalline form which are prepared from a solution of a lead salt and a solution containing chromate and sulfate ions in the presence of acetic acid, aluminium ions and phosphate ions, are disclosed in U.S. published patent application B 324879. The formation of lead carbonate during precipitation is avoided as far as possible. The pigment properties, especially lightfastness, can be improved by coating the pigments with amorphous silica.

The present invention relates to orthorhombic lead chromate pigments of greenish hue which contain lead chromate and lead sulfate in the weight ratio of 60:40 to 100:0, and which are characterised by a tinctorial strength of 0.067 to 0.103 at the standard depth of shade of 1/25 in accordance with DIN 53 235, and by an opacity factor of $Y_{black}/Y_{white}$ of 0.78 to 0.87, which pigments are obtainable by mixing an aqueous solution of a lead salt with an aqueous solution of a chromate and, if necessary, of a sulfate, under high turbulence.

Among the above-mentioned lead chromate pigments of greenish hue, those pigments are preferred which contain lead chromate and lead sulfate in the weight ratio of 65:35 to 90:10 and, in particular, from 75:25 to 88:12, and which are characterised by the tristimulus values X, Y and Z determined in accordance with DIN 5033 and lying within the colour range bounded by the co-ordinates $57.0 \leq X \leq 61.5$, $61.0 \leq Y \leq 67.0$ and $4.0 \leq Z \leq 7.0$.

Orthorhombic lead chromate pigments, wherein the weight ratio of lead chromate to lead sulfate is 75:25 to 88:12, are preferred.

The aqueous solution of a lead salt employed herein will suitably be, for example, an aqueous solution of lead acetate, preferably lead nitrate, and the aqueous solution of a chromate will suitably be, for example, an aqueous solution of sodium or potassium chromate or, preferably, of sodium bichromate. The aqueous solution of a sulfate will suitably be, for example, an aqueous solution of sodium, potassium or ammonium sulfate.

The high turbulance can be achieved by various means, for example by continuously combining the solutions in a mixing nozzle. A mixing nozzle will be understood as meaning a device in which the solutions to be mixed are combined with one another in a relatively small space, with at least one solution being introduced through a nozzle, preferably under elevated pressure. The mixing nozzle can be constructed on the principle of the water jet pump, such that the supply of one liquid in the mixing nozzle corresponds to the water supply in the water jet pump, and the supply of the other liquid in the mixing nozzle corresponds to the connection between the vessel to be evacuated in the water jet pump, which last mentioned supply of liquid may also be made under elevated pressure (q.v. FIG. 1).

The precipitation in the mixing nozzle is conveniently effected by continuously combining the aqueous solution of the chromate and the sulfate at a rate of flow of at least 4.9 m/sec with the aqueous solution of the lead salt at a rate of flow of at least 0.08 m/sec, preferably at room temperature. It is preferred to carry out the precipitation at room temperature and in the pH range from 2 to 5, conveniently in the presence of an excess of lead ions of 0.003 to 0.012 mole per liter over the stoichiometric amount.

Another possibility of producing high turbulence when combining the solutions is afforded by commercially available high-performance stirrers, for example the Ultra-Terrax ® (Janke and Kunkel KG, Staufen, Federal Republic of Germany), the Ystral ® (Ystral GmbH, Ballrechten-Dottingen, Federal Republic of Germany), the Polytron ® (Kinematica, Kriens/Lucrene, Switzerland), the Silverson stirrer (Silverson Mach. Ltd., Cheshem, GB), or the Chemcol-Mixer ® (Chemiecolor AG, Kilchberg/Zürich, Switzerland). Other types of high-performance stirrers which may also be used include the Pendraulik ® (Pendraulik Machinen-and Apparate GmbH, Bad Münder am Deister, Federal Republic of Germany), and flow mixers such as those available from Gronfa Process Technik BV/Rozendaal, NL.

It is important that the addition of the solutions, viz. the solution of the lead salt and the chromate and sulfate solutions, is made in the immediate vicinity of the rotor shaft of the high-performance stirrer. Combining both main components in the zone of turbulence can be carried out continuously by simultaneous addition of the main components as well as discontinuously by adding the second component to the first one. In the former procedure, the chromate solution and, optionally, the sulfate solution on the one hand and the solution of a lead salt on the other, are conveniently fed through two separate lines to the immediate vicinity of the rotor shaft. In the latter procedure, the flask is charged with the solution of the lead salt and the chromate solution and, optionally, the sulfate solution are added through a pipe in the immediate vicinity of the rotor shaft of the high-performance stirrer. It must be ensured that, upon conclusion of the precipitation, an excess of lead ions of 0.003 to 0.012 mole per liter over the stoichiometric amount is present.

The precipitated orthorhombic lead chromate pigments are distinguished by a fine particle size.

Improved crystal structures can conveniently be obtained by allowing the crystals to ripen at room temperature or by warming them, for example to 35° C.

To improve the pigment properties, for example stability to heat, light and attack by chemicals, it is advantageous to provide the pigment particles with a protective coating during precipitation or by an aftertreatment by known methods described, for example, in U.S. Pat. Nos. 3 370 971, 3 639 133 and 4 046 588. To this end, inorganic compounds, for example aluminium, titanium, antimony, cerium or silicon compounds, or zinc phosphate or mixtures thereof, are deposited onto the pigment.

The amount of coating compound is conveniently from 2 to 40%, preferably 2 to 20% and, most preferably, 3 to 10%, based on the total weight of the pigment.

The resultant orthorhombic lead chromate pigments can additionally be treated with agents that improve their texture, for example with long chain alcohols, esters, acids or salts thereof, amines amides, waxes or resinous substances such as abietic acid, and the hydrogenation products, esters or salts thereof, and also with nonionic, anionic or cationic surfactants.

The working up of the lead chromate pigments is effected in conventional manner, for example by filtration, washing the filter cake with water to remove soluble salts, drying and comminuting.

The tristimulus values X, Y and Z of the lead chromate pigments are determined in accordance wit DIN 5033.

The lead chromate pigments of this invention are distinguished by excellent colour strength and excellent hiding power.

The tinctorial strength is expressed by that ratio of colour pigment present in a coating composition to white pigment that results in the standard depth of shade 1/25 of DIN 53 235. This ratio accordingly indicates the amount of colour pigment which, in admixture with a given amount of white pigment, makes it possible to prepare a coloured coating at a standard depth of shade of 1/25.

The hiding power is evaluated by applying a full shade coloured coating to a black and white contrast panel and determining thereon the opacity factor $Y_{black}/Y_{white}$ (contrast ratio) by means of colour measurements on the varnish film over a black and white ground.

In applications, the orthorhombic lead chromate pigments also have good lightfastness and excellent saturation in addition to excellent tinctorial strength. In addition, despite the excellent tinctorial strength of the pigments, the printing inks and coating compositions prepared therefrom have good rheological properties.

Surprisingly, in contrast to previous experience (as described e.g. in Kittel, "Pigmente", (1960), page 278, line 1 to 7), stable orthorhombic lead chromates containing lead chromate and lead sulfate with up to 100% by weight of lead chromate can be prepared.

The orthorhombic lead chromate pigments which are prepared with the aid of a high-performance stirrer and which contain lead chromate and lead sulfate in the weight ratio 91:9 to 100:0 constitute novel compounds, also with respect to the ratio of lead chromate to lead sulfate. Among these pigments, preferred compounds are orthorhombic lead chromate pigments in which the weight ratio of lead chromate to lead sulfate is from 91:9 to 96:4.

The lead chromate content is determined after titration of the pigment in accordance with the method described by I. M. Kolthoff, R. Belcher, V. A. Strenger and G. Maysuyama in "Volumetric Analysis, Volume III, Titration Methods" (Interscience Publishersa, New York, 1975).

The lead sulfate content is determined, after titration of the pigment, in accordance with the method described in "Vogel's Textbook of Quantitative Analysis", 4th edition, by J. Basset, R. C. Denney, G. H. Jeffery and J. Mendham (Longman; New York, 1978).

The pigments of the present invention can be used individually or in admixture with one another or with other pigments, for example phthalocyanine blue, molybdate orange or Berlin blue, for pigmenting organic material of high molecular weight, for example cellulose ethers and esters, acetyl cellulose, nitrocelluloe, natural or synthetic resins such as polymerisation or condensation resins, for example aminoplasts, in particular urea/formaldehyde and melamine/formaldehyde resins, phenoplasts, alkyd resins, polyolefins such as polyethylene or polypropylene, and also polystyrene, polyvinyl chloride, polyacrylonitrile, polyacrylates, polycarbonates, rubber, casein, silicone and silicone resins.

The high molecular weight compounds specified above can be in the form of plastic materials and melts as well as of spinning solutions, coating compositions and, in particular, printing inks. Depending on the end use, it is advantageous to use the novel pigments as toners or in the form of pigment preparations.

In the following Examples and in the description, parts and percentages are by weight, unless otherwise indicated.

EXAMPLE 1

A 5 liter reaction vessel equipped with high-performance stirrer (diameter of the rotor 4.0 cm; peripheral speed of the rotor 4 m/sec) is charged with 2500 ml of an aqueous solution containing 195 g of lead nitrate, 11.4 g of zinc nitrate.$3H_2O$ and 170 ml of a 10% solution of sodium hydroxide. Then 370 ml of an aqueous solution containing 63.7 g of sodium bichromate.$2H_2O$, 10.3 g of sodium sulfate and 10.3 g of aluminium sulfate.$18$-$H_2O$ are added from a glass tube, at room temperature and over 2 minutes, in the immediate vicinity of the rotor shaft of the high-performance stirrer.

After precipitation has taken place, the excess of lead is 0.01 mole of $Pb^{2+}/l$ over the stoichiometric amount. Then a solution of 19 g of titanium oxychloride in 120 ml of water is added and the pH is adjusted to 6.0 by addition of 20 g of sodium carbonate in 200 ml of water. The precipitate is thereafter warmed to 35° C. The crystal structure is ripened by allowing the precipitate to settle for 90 minutes. The batch is then stirred for 1 hour. To coat the pigment particles, a solution of 7.5 g of aluminium sulfate in 120 ml of water and then a solution of 10 g of 75% phosphoric acid water in 120 ml of water are added. The final pH value of 8 is adjusted by addition of 20 g of sodium carbonate in 200 ml of water. The precipitate is isolated by filtration and the filter cake is washed with water to remove soluble salts and dried at 90° C.

Composition of the mixed crystals: $PbCrO_4$: 78%, $PbSO_4$: 22%. Amount of coating in relation to the total weight of the pigment: 7%. The tristimulus values are: X=60.0, Y=63.9 and Z=6.4. The opacity factor $Y_{black}/Y_{white}$ is 0.78 and the tinctorial strength (at 1/25 standard depth of shade) is 0.096.

FIG. 2 is an electron photomicrograph of these mixed crystals, showing the pigment particles dispersed by ultrasonication for several seconds in a 50% mixture of ethyl alcohol/water (20,000×).

The lead chromate content is determined by the following procedure:

0.250 g of pigment is put into a 300 ml Erlenmeyer flask with ground stopper. Then 10 ml of 4N sodium hydroxide solution are added and the mixture is heated until the lead chromate is completely dissolved. The mixture is diluted with 40 ml of distilled water and cooled to room temperature. Then 0.5 g of sodium carbonate (anhydrous), 4.0 g of potassium iodide and 30 ml of 4N hydrochloric acid are added. The Erlenmeyer flask is immediately sealed with the stopper and, if necessary, cooled.

The mixture is then left to stand for 2 hours in the dark and shaken from time to time. Then 80 ml of distilled water and 0.5 g of sodium carbonate (anhydrous) are added and the mixture is titrated with sodium thiosulfate. Starch flour is added near the end point of the titration.

The lead sulfate content is determined by the following procedure:

0.5 to 1.0 g of pigment is weighed very exactly. Together with 6.0 g of sodium carbonate, the pigment is put into a 150 ml glass beaker and mixed, and then 50 ml of hot water are added. The mixture is boiled until the pigment is completely dissolved. Then another 50 ml of hot water are added and the glass beaker is placed for ½ hour on a water bath (90°–95° C.). The mixture is filtered and the filtrate is washed with a 1% solution of sodium carbonate. The filtrate is put into a 600 ml glass beaker and cautiously neutralised with hydrochloric acid until change of colour takes place, and another 10 ml of hydrochloric acid are subsequently added. Then 10 ml of 3% hydrogen peroxide are added and the mixture is boiled for 10 minutes until the chromate is reduced to trivalent chromium. Then 50 ml of glacial acetic acid are added and the mixture is diluted to a volume of about 400 ml.

The solution is heated to 100° C. and then 50 ml of a boiling 0.1N solution of barium chloride are added rapidly. The mixture is analysed for excess barium and heated for 2 hours on a water bath. The barium sulfate precipitate is filtered (MN 640 d filter) and washed free of chloride with HCL (1:99) and hot water. The precipitate is dried at 105°–110° C. and incinerated and roasted at 800° C. to constant weight.

The content of lead chromate and lead sulfate is also determined by these methods in all subsequent Examples.

EXAMPLE 2

A pigment wherein the ratio of $PbCrO_4/PbSO_4$ is 89.11, and prepared by the procedure described in Example 1, has the tristimulus values $X=59.7$, $Y=61.7$ and $Z=4.7$, an opacity factor of 0.84 and a tinctorial strength of 0.079 at standard depth of shade 1/25.

FIG. 3 shows an electron photomicrograph of these mixed crystals, showing the pigment particles dispersed by ultrasonics for a few seconds in a 50% mixture of ethyl alcohol/water (20,000×).

EXAMPLE 3

A reaction vessel equipped with high-performance stirrer (diameter of the rotor 4.0 cm, peripheral speed of the rotor 4 m/sec) is charged with 5000 ml of water, 16 g of lead nitrate and 11.4 g of zinc nitrate.$3H_2O$. Then 1000 ml of an aqueous solution containing 63.7 g of sodium bichromate.$2H_2O$, 6.1 g of anhydrous sodium sulfate, 9.7 g of aluminium sulfate.$18H_2O$ and 1000 ml of an aqueous solution containing 166 g of lead nitrate and 18 g of 100% sodium hydroxide are added simultaneously from a glass tube, at room temperature and over 10 minutes, in the immediate vicinity of the rotor shaft of the high-performance stirrer. During and after precipitation, the excess of lead is 0.01 mole of $Pb^{2+}$/l over the stoichiometric amount.

Then a solution of 19 g of titanium oxychloride in 120 ml is added. The pH is adjusted to 6.0 by addition of 20 g of sodium carbonate in 200 ml of water. The precipitate is warmed to 35° C. The crystal structure is ripened by leaving the precipitate to settle for 90 minutes. The batch is then stirred for 1 hour.

The pigment particles are coated by adding a solution of 7.5 g of aluminium sulfate in 120 ml of water and then a solution of 10 g of 75% phosphoric acid in 120 ml of water. The final pH value is adjusted to 8.0 by addition of 20 g of sodium carbonate in 200 ml of water. The precipitate is isolated by filtration and the filter cake is washed with water to remove soluble salts and dried at 90° C.

Composition of the mixed crystals: $PbCrO_4$: 83%, $PbSO_4$: 17%. Amount of coating in relation to the total weight of the pigment: 7%. The tristimulus values are: $X=59.2$, $Y=61.0$ and $Z=4.5$.

The opacity factor $Y_{black}/Y_{white}$ is 0.78 and the tinctorial strength (at 1/25 standard depth of shade) is 0.113.

FIG. 4 is an electron photomicrograph of these mixed crystals, showing the pigment particles dispersed by ultrasonication for several seconds in a 50% mixture of ethyl alcohol/water (20,000×)

EXAMPLE 4

A pigment wherein the ratio of $PbCrO_4/PbSO_4$ is 87.13, and prepared by the procedure described in Example 3, has the tristimulus values $X=59.0$, $Y=61.0$ and $Z=4.6$, an opacity factor of 0.83 and a tinctorial strength of 0.089 at standard depth of shade 1/25.

FIG. 5 shows an electron photomicrograph of these mixed crystals, showing the pigment particles dispersed by ultrasonics for a few seconds in a 50% mixture of ethyl alcohol/water (20,000×).

EXAMPLE 5

A 50 liter reaction vessel equipped with high-performance stirrer (diameter of the rotor 4.0 cm, peripheral speed of the rotor 17 m/sec) is charged with 25 liters of an aqueous solution containing 972.0 g of lead nitrate, 114.0 g of zinc nitrate.$3H_2O$, 12.5 g of sodium aluminate ($NaAlO_2$) and 650 ml of a 10% sodium hydroxide solution. Then an aqueous solution containing 357.5 g of sodium bichromate.$2H_2O$ and 12.5 g of anhydrous sodium sulfate is added from a glass tube, at room temperature and over 5 minutes, in the immediate vicinity of the rotor shaft of the high-performance stirrer. After precipitation, the excess of lead is 0.01 mole of $Pb^{2+}$/l over the stoichiometric amount. The pH of the reaction mixture is adjusted to 6.0 by addition of about 90 g of anhydrous sodium carbonate in 500 ml of water.

The pigment particles are coated by adding a solution of 37.5 g of aluminium sulfate .$18H_2O$ in 400 ml of water and then a solution of 10 g of 75% phosphoric acid in 120 ml of water. The final pH value is adjusted to 8.0 by addition of about 90 g of anhydrous sodium carbonate in 500 ml of water. The precipitate is isolated by filtration and the filter cake is washed with water to remove soluble salts and dried at 90° C.

Composition of the mixed crystals: $PbCrO_4$: 94.7%, $PbSO_4$: 5.3%. Amount of coating in relation to the total weight of the pigment: 7%. The tristimulus values are: $X=59.6$, $Y=60.6$ and $Z=4.4$.

The opacity factor $Y_{black}/Y_{white}$ is 0.79 and the tinctorial strength (at 1/25 standard depth of shade) is 0.072.

FIG. 6 is an electron photomicrograph of these mixed crystals, showing the pigment particles dispersed by ultrasonication for several seconds in a 50% mixture of ethyl alcohol/water (20,000×).

EXAMPLE 6

A 50 liter reaction vessel equipped with high-performance stirrer (diameter of the rotor 4.0 cm, peripheral velocity of the rotor 17 m/sec) is charged with 25 liters of an aqueous solution containing 943.0 g of lead nitrate, 114.0 g of zinc nitrate.$3H_2O$, 12.5 g of sodium aluminate (NaAlO$_2$) and 650 ml of a 10% sodium hydroxide solution. Then an aqueous solution containing 357.5 g of sodium bichromate.2H$_2$O is added from a glass tube, at room temperature and over 5 minutes, in the immediate vicinity of the rotor shaft of the high-performance stirrer. After precipitation, the excess of lead is 0.01 mole of Pb$^{2+}$/l over the stoichiometric amount. The pH of the reaction mixture is adjusted to 6.0 by addition of about 90 g of anhydrous sodium carbonate in 500 ml of water.

The pigment particles are coated by adding a solution of 37.5 g of aluminium sulfate .18H$_2$O in 400 ml of water and then a solution of 50 g of a 75% H$_3$PO$_4$ solution in 400 ml of water. The final pH value is adjusted to 8.0 by addition of about 90 g of anhydrous sodium carbonate in 500 ml of water. The precipitate is isolated by filtration, and the filter cake is washed with water to remove soluble salts and dried at 90° C.

Composition of the mixed crystals: PbCrO$_4$: 97.6%, PbSO$_4$: 2.4%. Amount of coating in relation to the total weight of the pigment: 7%. The tristimulus values are: X=60.0, Y=61.4 and Z=4.4.

The opacity factor Y$_{black}$/Y$_{white}$ is 0.82 and the tinctorial strength (at 1/25 standard depth of shade) is 0.069.

FIG. 7 is an electron photomicrograph of these mixed crystals, showing the pigment particles dispersed by ultrasonication for several seconds in a 50% mixture of ethyl alcohol/water (20,000×).

EXAMPLE 7

A 50 liter reaction vessel equipped with high-performance stirrer (diameter of the rotor 4.0 cm, peripheral velocity of the rotor 17 m/sec) is charged with 25 liters of an aqueous solution (in distilled water) containing 943 g of lead nitrate, 114.0 g of zinc nitrate.3H$_2$O, 12.5 g of sodium aluminate (NaAlO$_2$.OH$_2$O) and 650 ml of a 10% solution of sodium hydroxide. Then 1500 ml of an aqueous solution containing 357.5 g of sodium bichromate.2H$_2$O are added from a glass tube, at room temperature and over 5 minutes, in the immediate vicinity of the rotor shaft of the high-performance stirrer. After precipitation, the excess of lead is 0.001 mole of PB$^{2+}$/l over the stoichiometric amount. The pH of the reaction mixture adjusted to 6.0 by addition of about 90 g of anhydrous sodium carbonate in 500 ml of distilled water.

The pigment particles are coated by adding a solution of 37.5 parts of aluminium sulfate.18H$_2$O in 400 ml of distilled water, and subsequently adding a solution of 50 g of 75% H$_3$PO$_4$ in 400 ml of distilled water. The final pH value is adjusted to 8 addition of about 90 g of anhydrous sodium carbonate in 500 ml of distilled water. The precipitate is isolated by filtration, and the filter cake is washed with distilled water to remove soluble salts and dried at 90° C.

Composition of the mixed crystals: 99.9% of PbCrO$_4$ and 0.1% PbSO$_4$. Amount of coating in relation to the total weight of the pigment: 7%. The tristimulus values are: X=58.9, Y=59.5 and Z=3.9. The tinctorial strength (at 1/25 standard depth of shade) is 0.070 and the opacity factor Y$_{black}$/Y$_{white}$ is 0.83.

FIG. 8 is an electron photomicrograph of these mixed crystals, showing the pigment particles dispersed by ultrasonication for several seconds in a 50% mixture of ethyl alcohol/water (20,000×).

EXAMPLE 8

A 5 liter reaction vessel equipped with high-performance stirrer (diameter of the rotor 4.0 cm; peripheral speed of the rotor 4 m/sec) is charged with 2500 ml of an aqueous solution containing 195 g of lead nitrate, 11.4 g of zinc nitrate.3H$_2$O and 170 ml of a 10% solution of sodium hydroxide. Then 370 ml of an aqueous solution containing 63.7 g of sodium bichromate.2H$_2$O, 10.3 g of sodium sulfate and 10.3 g of aluminium sulfate.18-H$_2$O are added from a glass tube, at room temperature and over 2 minutes, in the immediate vicinity of the rotor shaft of the high-performance stirrer.

After precipitation has taken place, the excess of lead is 0.01 mole of Pb$^{2+}$/l over the stoichiometric amount. Then a solution of 19 g of titanium oxychloride in 120 ml of water is added and the pH is adjusted to 6.0 by addition of 20 g of sodium carbonate in 200 ml of water. The precipitate is thereafter warmed to 35° C. The crystal structure is ripened by allowing the precipitate to settle for 90 minutes. The batch is then stirred for 1 hour. To coat the pigment particles, a solution of 7.5 g of aluminium sulfate in 120 ml of water and then a solution of 10 g of 75% phosphoric acid water in 120 ml of water are added. The final pH value of 8 is adjusted by addition of 20 g of sodium carbonate in 200 ml of water. The precipitate is isolated by filtration and the filter cake is washed with water to remove soluble salts and dried at 90° C.

Composition of the mixed crystals: PbCrO$_4$: 60%, PbSO$_4$: 40%. Amount of coating in relation to the total weight of the pigment: 7%.

EXAMPLE 9

(Application in letterpress printing)

1 g of the pigment obtained in Example 1 is finely ground in an Engelsmann grinding machine with 4.0 g of a litho varnish of the composition:

29.4% of linseed oil-stand oil (300 poise)
67.2% of linseed oil-stand oil (20 poise)
2.1% of cobalt octoate (8% Co) and
1.3% of lead octoate (24% Pb).

Using a stereotype block, this varnish is printed in an amount of 1 g/m$^2$ on art paper by letterpress printing. A strong yellow shade of good tinctorial strenght and good gloss is obtained.

The pigment is also suitable for other printing methods, such as intaglio printing, offset printing, flexographic printing, with equally good results.

EXAMPLE 10

(Application in PVC)

0.6 g of the pigment obtained in Example 1 is mixed with 76 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The greenish yellow shade obtained is strong and fast to migration and light.

EXAMPLE 11

(Application in polystyrene)

0.05 of the pigment obtained in Example 1 is mixed dry with 100 g of polystyrene. The mixture is kneaded in the temperature range from 180°–220° C. until a homogeneous coloration is obtained. The coloured plastic material is cooled and then ground in a mill to a particle size of about 2 to 4 mm.

The granular formulation so obtained is processed in an injection moulding machine to moulded articles in the temperature range from 220°–300° C. The products are coloured in a greenish yellow shade of good lightfastness and good thermal stability.

EXAMPLE 12

(Application in an alkyld melamine varnish)

The following mixture is prepared: 60 g of a 60% solution of a non-drying alkyd resin in xylene (available from Reichold-Albert-Chemie under the registered trademark Beckosol ® 27-320), 36 g of a 50% solution of a melamine/formaldehyde resin in a mixture of alcohol and aromatics (available from Reichold-Albert-Chemie under the registered trademark Super-Beckamin ® 13-501), 2 g of xylene and 2 g of methyl cellosolve. 100 g of this mixture is stirred with a stirrer to give a homogeneous varnish solution. 95 g of the clear varnish solution so obtained and 5 g of the pigment of Example 1 are ground for 72 hours in a ball mill. The coloured varnish solution is then applied to metal by a conventional spraying method and stoved for 30 minutes at 120° C. A yellow coating of good lightfastness is obtained.

Preparation of the lacquer coating for determining the tristimulus values, the depth of shade and the opacity factor (contrast ratio):

A. Method of preparing the full shade coating

Lacquer films are prepared in the following manner to determine the tristimulus values and the opacity factor:

The following ingredients are put, in succession, into a 100 ml glass beaker:
70 g of glass beads (diameter 3 mm)
13.6 g of dispersing medium and
10.0 g of colour pigment.

The dispersing medium comprises:
34.4% of alkyd varnish [Sigmol ® 820, soya naphthalate of an alkyd resin, 70% by weight, dissolved in Shellsol ® H (white spirit), available from Necarbo],
47.0% of solvent (Shellsol ® H),
0.3% of dispersant [Borchichen ® 911 (soya lecithin), available from Borchers],
0.8% of antiprecipitant (Lukatine ®, 10% in Shellsol ® H),
1.1% of antiflocculant (1% silicone oil in Shellsol ® H, available from Byk-Malinckrodt),
16.4% of siccative (mixture of octanoate salts, 13% Pb, 65% Co, 0.9% Ca).

Dispersing is effected by shaking the glass beaker and the contents thereof for 10 minutes in a "Red Devil" paint shaker. Then 35 parts by weight of Sigmol ® 820 are added and the batch is dispersed once more for 10 minutes in the "Red Devil". A film is then applied with a Bird Applicator BA-30 ® to a paint panel (panel supplied by Leneta, USA, Form 2A, and WdX), and the film is dried in the air for 12 hours (wet film thickness: 30 microns). The colour measurements are then made.

B. Procedure for preparing the lacquer extended with white pigment

To determine the tinctorial strength, a coating is prepared in the same manner as described above, except that, instead of 10.0 g of colour pigment, only the amount of colour pigment required for adjusting the standard depth of shade of 1/25 and, in addition, 10.0 g of titanium dioxide (Type RCR-2, available from Tioxide) are added.

C. Colorimetry

The colour measurements are carried out by testing the lacquer coatings. The tristimulus values X, Y and Z and the tinctorial strength are determined by testing the lacquer films only on a white ground. To determine the opacity factor $Y_{black}/Y_{white}$, measurements are carried out by assessing the lacquer films on a black and on a white ground.

The measurement of the 16 reflectance values and the determination of the tristimulus values X, Y and Z are made in accordance with DIN 5033 for standard type of light D 65 and 10° standard observation, including gloss.

The determination of the tinctorial strength in accordance with DIN 53 235 has already been discussed above.

| Technical data of the measuring apparatus | |
|---|---|
| spectrophotomoter | Zeiss RFC-3 ® |
| geometry | d/8° |
| aperture | 30 mm |
| wavelength | 400–700 nm, every 20 nm. |

Calibration

The white standard is prepared from BaSO4 for colorimetry (Merck). To this end a tablet is pressed and the measured values are entered as absolute values. The black standard (Zeiss) is a tube lined with velvet and sealed at one end (reflectance value 0%).

What is claimed is:

1. An orthorhombic lead chromate pigment of greenish hue, which contain lead chromate and lead sulfate in the weight ratio of 60:40 to 100:0, and which is characterised by a tinctorial strength of 0.067 to 0.103 at a standard depth of shade of 1/25 in accordance with DIN 53 235 and by an opacity factor $Y_{black}/Y_{white}$ of 0.78 to 0.87, which pigment is obtainable by mixing an aqueous solution of a lead salt with an aqueous solution of a chromate and, when the pigment contains lead sulfate, of a sulfate, under high turbulence.

2. A lead chromate pigment according to claim 1, which contains lead chromate and lead sulfate in the weight ratio of 65:35 to 90:10, and is characterized by the tristimulus values X, Y and Z determined in accordance with DIN 5033, which values lie within the colour space bounded by the co-ordinates $57.0 \leq X \leq 61.5$, $61.0 \leq Y \leq 67.0$ and $4.0 \leq Z \leq 7.0$.

3. A lead chromate pigment according to claim 2, which contains lead chromate and lead sulfate in the weight ratio of 75:25 to 88:12.

4. A lead chromate pigment according to claim 1, which additionally contains a surface-active agent.

5. A lead chromate pigment which is obtainable by providing the pigment according to claim 1, during precipitation or by an after-treatment, with a coating of an inorganic coating agent.

6. A lead chromate pigment according to claim 5, which contains 2 to 40% of an inorganic coating agent.

7. A lead chromate according to claim 5, which contains 2 to 20% of an inorganic coating agent.

8. A lead chromate pigment according to claim 5, which contains 3 to 10% of an inorganic coating agent.

9. A lead chromate pigment according to claim 1, which is obtainable by producing the turbulence by means of a high rate of flow or by mechanical stirring.

10. A lead chromate pigment according to claim 1, which is obtainable by the presence of an excess of lead ions of 0.003 to 0.12 mole per liter over the stoichiometric amount, during or after the precipitation.

11. An orthorhombic lead chromate pigment according to claim 1 which contains lead chromate and lead sulfate in the weight ratio of lead chromate to lead sulfate of 91:9 to 100:0.

12. An orthorhombic lead chromate pigment according to claim 11, wherein the weight ratio of lead chromate to lead sulfate is 91:9 to 96:4.

13. A process for the preparation of an orthorhomic pigment which contains lead sulfate in the weight ratio of 91:9 to 100:0, which process comprises mixing an aqueous solution of a lead salt with an aqueous solution of a chromate and, when the pigment contains lead sulfate, of a sulfate, in a high-performance stirring apparatus.

14. Organic material of high molecular weight which contains a lead chromate pigment as claimed in claim 1.

* * * * *